United States Patent
Dhodapkar et al.

(10) Patent No.: US 11,421,085 B2
(45) Date of Patent: Aug. 23, 2022

(54) EPDM PACKAGING SYSTEM AND PROCESS

(71) Applicant: Dow Global Technologies LLC, Midland, MI (US)

(72) Inventors: Shrikant Dhodapkar, Lake Jackson, TX (US); Remi A. Trottier, Angleton, TX (US); Santosh S. Bawiskar, Pearland, TX (US); Kyle D. Anderson, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 652 days.

(21) Appl. No.: 16/406,509

(22) Filed: May 8, 2019

(65) Prior Publication Data

US 2019/0263581 A1 Aug. 29, 2019

Related U.S. Application Data

(62) Division of application No. 14/773,896, filed as application No. PCT/US2014/027665 on Mar. 14, 2014, now Pat. No. 10,329,071.

(Continued)

(51) Int. Cl.
*B65B 1/04* (2006.01)
*C08J 7/06* (2006.01)
(Continued)

(52) U.S. Cl.
CPC .............. *C08J 3/124* (2013.01); *B65B 1/04* (2013.01); *B65B 7/02* (2013.01); *B65D 81/264* (2013.01);
(Continued)

(58) Field of Classification Search
CPC ........ C08J 2323/16; C08J 3/124; C08J 3/128; C08J 7/06; C08F 210/16; C08F 210/18;
(Continued)

(56) References Cited

U.S. PATENT DOCUMENTS 2,639,808 A * 5/1953 Barry ............... C08J 7/0427
206/447
3,646,183 A 2/1972 Topcik
(Continued)

FOREIGN PATENT DOCUMENTS

EP 0047374 A1 3/1982
EP 0100434 A 2/1984
(Continued)

OTHER PUBLICATIONS

PPG-Hisil, LO-VEL, and SILENE Precipitated Silicas from PPG available online at http:/www.ppgsilica.com/getmedia/ce31e295-e5a6-4e30-b873-4af9178ca966/PPG_Hi-Sil_Lo-Vel-Silene_GPSRIS_0318.aspx on Aug. 9, 2018 (Year: 2018).*

(Continued)

*Primary Examiner* — Lee E Sanderson
(74) *Attorney, Agent, or Firm* — Quarles & Brady LLP (57) ABSTRACT

The present disclosure provides a packaging process and the resultant package produced from the process. The process includes introducing, into a mixing device, pellets composed of ethylene/propylene/diene polymer (EPDM). The EPDM comprises greater than 60 wt % units derived from ethylene. The pellets have a residual moisture content from 500 ppm to 2500 ppm. The process includes adding a silica-based powder to the mixing device and coating at least a portion of the pellets with the silica-based powder. The process includes sealing a bulk amount of the coated pellets in a bag made of a flexible polymeric film. The process includes absorbing, with the silica-based powder, the residual moisture from the pellets, and preventing moisture condensation in the bag interior for a period from 7 days after the sealing step to 1000 days after the sealing step.

7 Claims, 3 Drawing Sheets

Related U.S. Application Data (60) Provisional application No. 61/793,701, filed on Mar. 15, 2013.

(51) Int. Cl.

| | | |
|---|---|---|
| *B65D 81/26* | (2006.01) | |
| *C08J 3/12* | (2006.01) | |
| *B65B 7/02* | (2006.01) | |
| *C08K 3/36* | (2006.01) | |

(52) U.S. Cl.
CPC ............ *C08J 3/128* (2013.01); *C08J 7/06* (2013.01); *C08K 3/36* (2013.01); *C08J 2323/16* (2013.01)

(58) Field of Classification Search
CPC .... C08F 236/00; C08F 236/02; C08F 236/20; C08L 23/083; C08L 23/0815; C08L 23/16; Y10T 428/13034; Y10T 428/1352; Y10T 428/1355; Y10T 428/1359; Y10T 428/2991; B29B 2009/163; C08K 3/36; B65B 1/04; B65B 7/02; B65D 81/264
USPC ............ 526/335; 428/35.2, 35.7, 35.8, 35.9; 525/160
See application file for complete search history.

(56) References Cited

U.S. PATENT DOCUMENTS

| | | | |
|---|---|---|---|
| 3,650,971 A | | 3/1972 | Tobey |
| 3,787,221 A | | 1/1974 | Topcik |
| 3,824,208 A | | 7/1974 | Link |
| 4,119,759 A | | 10/1978 | Fischer et al. |
| 4,183,887 A | | 1/1980 | Karg |
| 4,212,918 A | | 7/1980 | Marquisee |
| 4,213,888 A | | 7/1980 | Gros et al. |
| 4,232,126 A | | 11/1980 | Marquisee |
| 4,233,365 A | * | 11/1980 | Karg ............... C08J 3/124 264/138 |
| 4,265,939 A | | 5/1981 | Tebbens et al. |
| 4,345,058 A | | 8/1982 | Dettling |
| 4,357,439 A | | 11/1982 | Bluemel et al. |
| 4,359,492 A | | 11/1982 | Schlademan |
| 4,431,765 A | | 2/1984 | Doshak et al. |
| 4,755,343 A | | 7/1988 | Kromrey |
| 5,017,630 A | | 5/1991 | Raines et al. |
| 5,166,227 A | | 11/1992 | Raines et al. |
| 5,167,707 A | | 12/1992 | Freeman et al. |
| 5,252,007 A | | 10/1993 | Klinzing et al. |
| 5,304,588 A | | 4/1994 | Boysen et al. |
| 5,366,645 A | | 11/1994 | Sobuttka |
| 5,792,808 A | | 8/1998 | Sobuttka et al. |
| 5,792,987 A | | 8/1998 | Dong et al. |
| 5,911,963 A | | 6/1999 | Krivak et al. |
| 6,072,004 A | | 6/2000 | Migchels et al. |
| 6,120,899 A | | 9/2000 | Cameron et al. |
| 6,143,829 A | * | 11/2000 | Babb ............... C08K 5/43 525/212 |
| 6,159,277 A | | 12/2000 | Tanaka et al. |
| 6,160,047 A | | 12/2000 | Agostini et al. |
| 6,176,285 B1 | | 1/2001 | Gerresheim et al. |
| 6,194,518 B1 | | 2/2001 | Singh et al. |
| 6,200,509 B1 | | 3/2001 | Neubauer et al. |
| 6,265,356 B1 | | 7/2001 | Sugai |
| 6,295,211 B1 | | 9/2001 | Nishida et al. |
| 6,342,193 B1 | | 1/2002 | Tanaka et al. |
| 6,517,335 B1 | * | 2/2003 | Long ............... B29C 48/92 425/135 |
| 6,852,787 B1 | | 2/2005 | McMichael et al. |
| 7,122,584 B2 | | 10/2006 | Moriya et al. |
| 7,199,191 B2 | | 4/2007 | Johnson et al. |
| 7,662,363 B2 | | 2/2010 | Stanier et al. |
| 8,273,826 B2 | | 9/2012 | Walton et al. |
| 2001/0049423 A1 | | 12/2001 | Wang et al. |
| 2002/0115794 A1 | | 8/2002 | Singh et al. |
| 2002/0132924 A1 | | 9/2002 | Singh et al. |
| 2003/0162902 A1 | | 8/2003 | Singh et al. |
| 2003/0181553 A1 | | 9/2003 | Moriya et al. |
| 2004/0209082 A1 | * | 10/2004 | Lee ............... A23G 4/08 428/407 |
| 2005/0085581 A1 | | 4/2005 | McMichael et al. |
| 2007/0034840 A1 | | 2/2007 | McMichael et al. |
| 2007/0129514 A1 | * | 6/2007 | Ravishankar ........... C08F 10/00 526/170 |
| 2008/0269398 A1 | | 10/2008 | Memon |
| 2009/0321300 A1 | | 12/2009 | Komiya et al. |
| 2010/0124607 A1 | | 5/2010 | Berti et al. |
| 2011/0008623 A1 | | 1/2011 | Dhodapkar et al. |
| 2013/0018150 A1 | | 1/2013 | Walton et al. |

FOREIGN PATENT DOCUMENTS

| | | |
|---|---|---|
| EP | 0570966 A1 | 11/1993 |
| EP | 0867494 A2 | 9/1998 |
| EP | 1403313 A1 | 3/2004 |
| WO | 83/003421 A1 | 10/1983 |
| WO | 99/018148 A1 | 4/1999 |
| WO | 99/19385 A1 | 4/1999 |
| WO | 01/12716 A2 | 2/2001 |
| WO | 2010/100083 A1 | 9/2010 |

OTHER PUBLICATIONS

Hi-Sil 200 Series Rubber Reinforcing Silica Product from PPG available online at http:// www.ppgsilica.com/getmedia/24c1f42f-116c-47fb-8c94-dc13c49b8b89/HiSil200SeriesBrochure.pdf.aspx on Aug. 9, 2018 (Year: 2018).*

Williams et al., J. Polym. Sci., Polym. Let., vol. 6, pp. 621-624 (1968).

International Search Report and Written Opinion for International Application No. PCT/US2014/027665 dated Jul. 21, 2014, 9 pages.

PPG Industries, PPG-HiSil, LO-VEL, and SILENE Precipitated Silicas available online at http://www.ppgsilica.com/getmedia/ce31e295-e5a6-4e30-b873-4af9178ca966/PPG_Hi-Sil_Lo-Vel_Silene_GPSRIS_0318.aspx (Year: 2018).

PPG Industries, Hi-Sil 200 Series Rubber Reinforcing Silica Product from PPG available online at http://www.ppgsilica.com/getmedia/24c1f42f-116c-47fb-8c94-dc13c49b8b89/HiSil200SeriesBrochure.pdf.aspx (Year: 2018).

Stanislav Zeman et al., Techn. Sc., No. 10, 2007, pp. 26-34.

* cited by examiner

Figure 2 (English Units)

Figure 3 (SI Units)

EPDM PACKAGING SYSTEM AND PROCESS

BACKGROUND

The term "ethylene-propylene-diene polymer," (or "EPDM") as used herein, is a saturated interpolymer chain composed of units derived from ethylene, propylene, and a diene. EPDM has a wide range of applications, such as insulation for wire and cable, hoses, and molded articles, for example.

Semi-crystalline EPDM grades (EPDM with at least 60 wt % units derived from ethylene) exhibit melt fracture during pelletization. The resulting melt fracture creates a rough surface with crevices trapping water during underwater pelletization, thereby making it difficult to dry the EPDM pellets in the process. Conventional dryers are unable to dry the pellets since the drying kinetics is diffusion rate controlled. The residual moisture results in long and costly warehouse drying times (on the order of weeks to months) before the EPDM pellets are sufficiently dry or can be shipped to customers for use.

Over time, the residual moisture migrates from the EPDM pellets and condenses on to the inner wall of the storage bags, or on to the inner surface of stretch-wrap covering the pallets supporting bulk pellets. This moisture condensation creates a quality concern for customers and end-use.

Conventional anti-blocking coatings such as talc and polyethylene dust, fail to mitigate moisture condensation within the packaging. A need exists for a process and system for packaging EPDM pellets, particularly semi-crystalline EPDM pellets, which reduce moisture condensation within the storage package.

SUMMARY

The present disclosure provides a process. In an embodiment, the process includes introducing, into a mixing device, pellets composed of ethylene/propylene/diene polymer (EPDM). The EPDM comprises greater than 60 wt % units derived from ethylene. The pellets have a residual moisture content from 500 ppm to 2500 ppm. The process includes adding a silica-based powder to the mixing device and coating at least a portion of the pellets with the silica-based powder. The process includes sealing a bulk amount of the coated pellets in a bag made of a flexible polymeric film. The process includes absorbing, with the silica-based powder, the residual moisture from the pellets, and preventing moisture condensation in the bag interior for a period from 7 days after the sealing step to 1000 days after the sealing step.

The present disclosure provides a package. In an embodiment, the package includes
A. a sealed bag formed from a flexible polymeric film; and
B. a bulk amount of coated pellets in an interior of the sealed bag. The pellets are composed of (i) EPDM comprising at least 60 wt % units derived from ethylene. The pellets have a residual moisture content from 500 ppm to 2500 ppm. The coated pellets include (ii) a coating on at least a portion of the pellets. The coating comprises a silica-based powder, and no moisture condensation is visible in the bag interior from 7 days after the bag is sealed to 1000 days after the bag is sealed.

DETAILED DESCRIPTION

1. Process

The present disclosure provides a process. In an embodiment, the process includes introducing pellets of ethylene/propylene/diene polymer (EPDM) into a mixing device. The EPDM includes at least 60 wt % units derived from ethylene. The pellets have a residual moisture content from 500 ppm to 2500 ppm. The process includes adding a silica-based powder to the mixing device and coating at least a portion of the pellets with the silica-based powder. The process further includes sealing a bulk amount of the coated pellets in a bag made of a flexible polymeric film and absorbing, with the silica-based powder, the residual moisture from the pellets that are sealed within the bag. The process further includes preventing moisture condensation in the bag interior for a period from seven days after the sealing step to 1000 days after the sealing step.

The term "ethylene/propylene/diene polymer," or "EPDM," as used herein, is as a polymer with a majority amount of units derived from ethylene, and also includes units derived from propylene comonomer, and units derived from a diene comonomer.

The EPDM includes units derived from a diene monomer. The diene can be conjugated-, non-conjugated-, straight chain-, branched chain- or cyclic-hydrocarbon diene having from 6 to 15 carbon atoms. Nonlimiting examples of suitable diene include 1,4-hexadiene; 1,6-octadiene; 1,7-octadiene; 1,9-decadiene; branched chain acyclic diene, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, norbornadiene, 1,4-hexadiene (HD), 5-ethylidene-2-norbornene (ENB), 5-vinylidene-2-norbornene (VNB), 5-methylene-2-norbornene (MNB), and dicyclopentadiene (DCPD).

In an embodiment, the diene is selected from VNB and ENB.

In an embodiment, the diene is ENB.

In an embodiment, the EPDM includes:
(i) at least 60 wt %, or 65 wt %, or 70 wt %, to 75 wt %, or 80, or 85 wt % units derived from ethylene;
(ii) from 15 wt %, or 20 wt % to 25 wt %, or 30 wt % units derived from propylene; and (iii) from 0.1 wt %, or 0.3 wt %, or 0.5 wt %, to 1.0 wt %, or 5 wt %, or 10 wt % units derived from diene. Weight percent is based on the total weight of the EPDM.

In an embodiment, the EPDM has a Mooney viscosity from 20, or 30, or 40, or 50, or 60, to 70, or 80, or 90, or 100, or 200, or 300.

The EPDM is made by contacting ethylene, propylene, and the diene with a catalyst, a cocatalyst, and optionally a chain transfer agent under polymerization conditions. The term "polymerization conditions," as used herein are temperature, pressure, reactant concentrations, solvent selection, chain transfer agent, reactant mixing/addition parameters, and/or other conditions within a polymerization reactor that promote reaction between the reagents and formation of the resultant product, namely the EPDM. Catalyst, cocatalyst and optionally chain transfer agent are continuously or intermittently introduced in the polymerization reactor containing the monomers to produce the EPDM.

In an embodiment, the catalyst used to make the present EPDM may be a polyvalent aryloxyether metal complex. A "polyvalent aryloxyether metal complex," as used herein, is a metal complex having the structure (I):

wherein $R^{20}$ independently each occurrence is a divalent aromatic or inertly substituted aromatic group containing from 5 to 20 atoms not counting hydrogen;

$T^3$ is a divalent hydrocarbon or silane group having from 1 to 20 atoms not counting hydrogen, or an inertly substituted derivative thereof; and $R^D$ independently each occurrence is a monovalent ligand group of from 1 to 20 atoms, not counting hydrogen, or two $R^D$ groups together are a divalent ligand group of from 1 to 20 atoms, not counting hydrogen.

In an embodiment, the catalyst is added to the reactor such that the EPDM contains less than 0.3 ppm zirconium or from 0.1 ppm to less than 0.3 ppm zirconium.

In an embodiment, the catalyst is dimethyl[[2',2'''-[1,2-cyclohexanediylbis(methyleneoxy-κO)]bis[3-(9H-carbazol-9-yl)-5-methyl[1,1'-biphenyl]-2-olato-κO]](2-)]-zirconium.

The cocatalyst used to make the present composition is an alumoxane. Nonlimiting examples of suitable alumoxanes include polymeric or oligomeric alumoxanes, such as methylalumoxane (MAO) as well as Lewis acid-modified alumoxanes (MMAO) such as trihydrocarbylaluminum-, halogenated tri(hydrocarbyl)aluminum—modified alumoxanes having from 1 to 10 carbons in each hydrocarbyl or halogenated hydrocarbyl group.

In an embodiment, the alumoxane is introduced into the polymerization reactor such that the EPDM contains less than 3.5 ppm aluminum. In a further embodiment, the EPDM contains from 1.0 ppm, or 2.0 ppm, or 2.5 ppm, to 3.0 ppm or less than 3.5 ppm aluminum.

The catalyst and the cocatalyst are boron-free. Accordingly, in an embodiment, the present composition is boron-free.

The EPDM is in the form of a pellet. A "pellet," as used herein, is a polymeric structure that is cylindrical, or substantially cylindrical, in shape. The pellet has a diameter from 2 millimeters (mm) or 3 mm to 9 mm or 10 mm. The pellet has a length from 2 mm, or 3 mm to 15 mm, or 20 mm. The pellet has a mass from 10 grams (g), or 12 g, or 14 g to 16 g, to 18 g, to 20 g.

In an embodiment, the EPDM pellet has a diameter from 3 mm to 9 mm and a length from 3 mm to 15 mm.

In another embodiment, the polymer pellet has a diameter from 3 mm to 9 mm and a length from 7 mm to 20 mm (often referred to as a "rod.")

In an embodiment, the EPDM is in the form of crumbs. A "crumb" is an irregular-shaped particle (not a geometrically regular form).

Figure 1A:
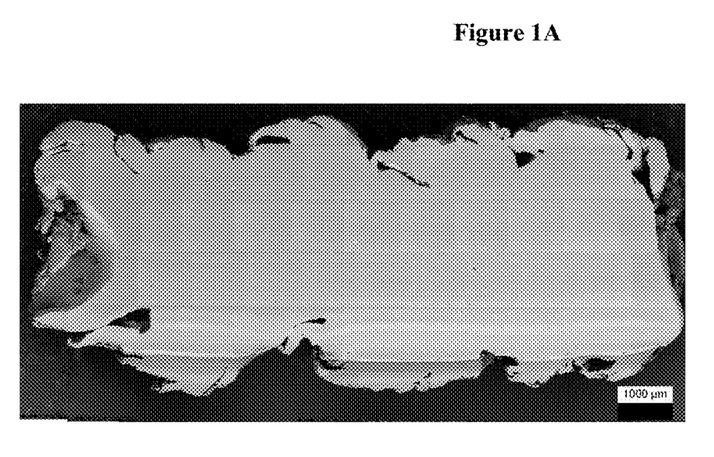
FIG. 1A is scanning election microscope (SEM) micrograph sectional view (longitudinal) of an EPDM pellet in accordance with an embodiment of the present disclosure.
Figure 1B:
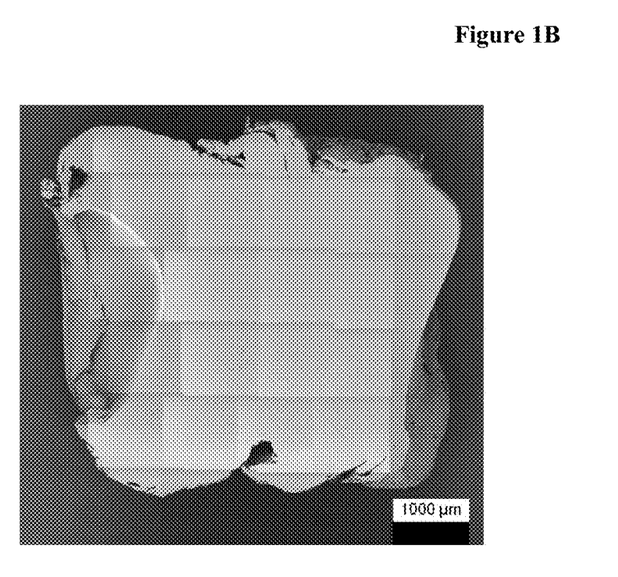
FIG. 1B is a SEM micrograph cross-sectional view of an EPDM pellet in accordance with an embodiment of the present disclosure.

In an embodiment, the EPDM pellet is a melt fracture pellet. The term "melt fracture pellet," as used herein, is a pellet with surface irregularity, the surface irregularity resulting from irregular extrusion flow conditions during pelletization. Extrusion irregularities may be classified into two main types: (i) surface melt fracture and (ii) gross melt fracture. Surface melt fracture ranges in detail from loss of specular gloss to the more severe form of "sharkskin." Gross melt fracture ranges in detail from regular (alternating rough and smooth, helical, etc.) to random distortions. In an embodiment, the EPDM pellets exhibit gross melt fracture. FIGS. 1A and 1B are SEM micrographs of an EPDM pellet exhibiting gross melt fracture surface irregularity.

The EPDM pellets contain residual moisture. The term "residual moisture," as used herein, is the average amount of moisture retained by the pellets after the pellets have been subjected to a post-pelletization drying procedure. A post-pelletization drying procedure typically utilizes a convective dryer with residence time up to 5 minutes to dry EPDM pellets during the production process. In embodiment, the EPDM pellets have a residual moisture content from 500 ppm, or 600 ppm, or 700 ppm, or 800 ppm to 1000 ppm, or 1500 ppm, or 2000 ppm, or 2500 ppm.

In an embodiment, the EPDM is a semi-crystalline EPDM. A "semi-crystalline EPDM" is an EPDM with greater than 60 wt % units derived from ethylene. In an embodiment, the EPDM is a semi-crystalline EPDM and contains from at least 60 wt % to 85 wt % units derived from ethylene.

In an embodiment, the pellets contains one, some, or all of the following properties:

(i) from 500 ppm to 2500 residual moisture;
(ii) gross melt fracture surface irregularity;
(iii) EPDM containing from 60 wt % to 85 wt % units derived from ethylene;
(iv) EPDM having a Mooney viscosity from 20-300; and
(v) EPDM containing from 0.5 wt % to 10 wt % ENB.

In an embodiment, the EPDM is an oil-extended EPDM composition. An "oil-extended EPDM," as used herein, is an EPDM composition that contains an (i) EPDM and (ii) at least 25 wt % oil, based on the total weight of the composition. The EPDM of the oil-extended EPDM composition can be any EPDM as disclosed above. In an embodiment, the oil-extended EPDM composition contains at least 30 wt %, or at least 40 wt % to 70 wt %, or 60 wt %, or 50 wt % oil. The oil can be an aromatic oil, a mineral oil, a naphthenic oil, paraffinic oil, and a triglyceride-based vegetable oil such as castor oil, a synthetic hydrocarbon oil such as polypropylene oil, a silicone oil, or any combination thereof.

The process includes introducing the EPDM pellets in a mixing device. The mixing device mechanically imparts a motion upon the pellets, or otherwise moves the pellets.

Nonlimiting examples of suitable motions and mixing devices include simple tumbling of a jar; blending in a conical rotating vessel, ribbon blender, drum tumbler, paddle blender, agglomeration pan; use of a pneumatic conveyor under air or inert gas; moderate stirring, shaking or even a short distance of conveying in a screw conveyor.

The present process includes adding a silica-based powder to the mixing device and coating at least a portion of the pellets with the silica-based powder. The term "silica-based powder," as used herein, is a powder containing one or more silica(s) in particulate form and optionally one or more additional blend powders.

In an embodiment, the process includes adding the silica-based powder in an amount from 3000 ppm, or 4000 ppm, or 5000 ppm, or 6000 ppm, or 7000 ppm to 8000 ppm, or 9000 ppm to 10,000 ppm. Weight percent is based on the total weight of the EPDM pellets and the silica-based powder.

The foregoing silicas are distinct from, and exclude, siloxanes which are organosilanes. Organosilanes, including, siloxanes, include a Si—C bond. In contrast, the present silica ($SiO_2$) does not include a Si—C bond.

In an embodiment, the silica-based powder includes an amorphous silica. The term "amorphous silica," as used herein, is a silica compound composed of silicon and oxygen that does not contain a measurable amount of crystalline silica (less than 0.01 wt % relative to quartz). and exhibits a local tetrahedral structure, but no further long range order in highly porous particles sized from 100 nm to 100 μm. The surface of the particles can be further modified or remain unmodified.

Amorphous silica is divided into naturally occurring amorphous silica and synthetic forms. Naturally occurring amorphous silica such as uncalcined diatomaceous earth usually contains certain amounts of crystalline silica, sometimes up to 8%.

In an embodiment, the present amorphous silica is a synthetic amorphous silica (SAS). SAS is intentionally manufactured amorphous silica that does not contain measurable levels of crystalline silica (<0.01% by weight relative to quartz). SAS is produced by the wet route (precipitated silica, silica gel) or the thermal route (pyrogenic silica). SAS, including pyrogenic silicas, precipitated silicas and silica gels, is white, fluffy powders or milky-white dispersions of these powders (usually in water). SAS is hydrophilic, but can be made hydrophobic by surface treatment.

Nonlimiting examples of suitable amorphous silica are provided in Table A below.

TABLE A

Some physical properties of amorphous silica powders*

| Material | Median Aggregate Size (μm) | Surface Area $m^2/g$ | Oil Absorption mL/100 g | Specific Gravity | Bulk Density $kg/m^3$ |
|---|---|---|---|---|---|
| Hi-Sil T600 (HST600) | 1.4 | 150 | 150 | 2.1 | 56 |
| Flow-Gard FF (FGFF) | 10 | 180 | 210 | 2.0 | 128 |
| Flow-Gard SP (FGSP) | 25 | 220 | 260 | 2.0 | 144 |
| Hi-Sil SC-72 (SC72) | 175 | 150 | 200-350 | 2.0 | 230 |

*From PPG Industries (2000)

In an embodiment, the amorphous silica is an amorphous fumed silica. The term "fumed silica," as used herein, is a non-crystalline, fine-grain, low bulk density and high surface area silica. Fumed silica primary particle size is 5-50 nm. Fumed silica particles are non-porous and typically have a surface area of 50-600 $m^2/g$ and a density of 2.2 $g/cm^3$. Fumed silica is made from flame pyrolysis of silicon tetrachloride or from quartz sand vaporized in a 3000° C. electric arc. The compacted volume of precipitated silica is lower than that of fumed silica since fumed silica consists of chain-shaped aggregates whereas precipitated silica consists of corpuscular, 3-dimensional aggregates.

In an embodiment, the amorphous silica is an amorphous precipitated silica. The term "precipitated silica," as used herein, is the reaction product of acidified sodium silicate followed by precipitation under alkaline conditions. Precipitated silica is distinguishable from silica gels, quartz silica, and fumed silica. Precipitated silica is porous whereas silica gels, quartz silica, and fumed silica are non-porous. Precipitated silica typically has a broad meso/macroporous pore structure reflected in the pore size distribution, whereas other silicas generally have a more narrow microporous or mesoporous structure. Precipitated silica particles have an average diameter of 5-100 nm, a surface area of 5-100 $m^2/g$, and a density of 1.9-2.1 $g/cm^3$. Agglomerate size is 1-40 μm with an average pore size of greater than 30 nm.

In an embodiment, the silica-based powder is a blend of a silica and one or more blend powders. Nonlimiting examples of suitable blend powders include talc, clay, mica, calcium carbonate, and any combination thereof.

In an embodiment, the silica-based powder is a blend of amorphous silica and talc. The silica-based powder has an amorphous silica-to-talc ratio from 1.0 to 2.0:1.

In an embodiment, the silica-based powder contains from 3000 ppm to 6000 ppm amorphous silica and from 6000 ppm to 3000 ppm talc.

The mixing device mixes the silica-based powder with the EPDM pellets, bringing the silica-based powder into contact with the surfaces of the EPDM pellets. The silica-based powder adheres to the outer surfaces of the pellets by way of Van der Waals forces, electrostatic forces and mechanical adhesion on rough pellet surface. The present process excludes adding a binding agent to the pellets.

The process includes sealing a bulk amount of the coated pellets in a bag formed from a flexible polymeric film. A "bulk amount," as used herein, is from 15 kg to 1500 kg of the EPDM pellets.

In an embodiment, a bulk amount from 20 kg to 25 kg of coated pellets is sealed in a bag.

In an embodiment, a bulk amount from 500 kg to 1200 kg of coated pellets is sealed in a bag and the bag (a liner) is placed in a container, such as a cardboard box container (bag-in-a-box).

In an embodiment, a bulk amount from 100 kg to 1500 kg of coated pellets is sealed in a bag (bulk bag).

The bag is made from a flexible polymeric film. Nonlimiting examples of suitable polymer for the flexible film include polyethylene, ethylvinyl acetate (EVA), polypropylene (PP), and polyethylene terephthalate (PET).

The process includes absorbing, with the silica-based powder, the residual moisture from the pellets, and preventing moisture condensation on a package inner surface for a period from 7 days after the sealing step, to 365 days (1 year) after the sealing step, to 1000 days after the sealing step.

As the pellets dwell in the bag interior, the residual moisture bound in the pellets gradually leaves the pellets. The silica-based powder absorbs this moisture migrating from the pellets. Whatever moisture escapes initial capture by the coating condenses inside the bag and is subsequently reabsorbed by the silica-based powder within 7 days. In this way, the silica-based powder coating prevents the residual moisture from the pellets from collecting or residing on the inner surface of the bag. Bounded by no particular theory, it is believed the silica-based powder is able to capture and retain the residual moisture and then subsequently release the residual moisture at delayed rate that is compatible with the water vapor transmission rate of the polymeric film such that no, or substantially no, residual moisture from the pellets condenses (i) on the bag interior or (ii) on the bag inner surface.

The present process may comprise two or more embodiments disclosed herein.

2. Article

The disclosure provides an article. In an embodiment, the article is a package. The package includes:

A. a sealed bag formed from a flexible polymeric film;

B. a bulk amount of coated pellets in an interior of the sealed bag. The coated pellets are composed of (i) ethylene/propylene/diene polymer comprising at least 60 wt % units derived from ethylene, the pellets having a residual moisture content from 500 ppm to 2500 ppm; and (ii) a coating on at least a portion of the pellets, the coating comprising a silica-based powder. No moisture condensation is visible in the bag interior from 7 days (168 hours) after the bag is sealed, to 365 days after the bag is sealed, or to 1000 days after the bag is sealed.

In an embodiment, the pellets sealed in bag have unconfined yield strength less than 200 pounds per square foot after 2 months of storage in a pallet at ambient temperature of 37° C.

In an embodiment, the pellets sealed in bag have an unconfined yield strength from 0, or greater than 0, or 10, or 50 to less than 150, or less than 200 pounds per square foot after 2 months of storage in a pallet at ambient temperature of 37° C. The pellets are considered non-blocky if the unconfined yield strength is less than 200 pounds per square foot after 2 months of storage at 37° C. In other words, pellets with an unconfined yield strength less than 200 pounds per square foot after 2 months storage at ambient temperature of 37° C. are considered "free-flowing" pellets.

In an embodiment, silica-based powder is an amorphous silica.

In an embodiment, the silica-based powder is a blend of an amorphous silica and talc.

In an embodiment, the pellets are EPDM pellets that exhibit gross melt fracture surface irregularity.

In an embodiment, the EPDM has a Mooney viscosity from 20 to 300.

In an embodiment, the EPDM has a Mooney viscosity from 20, or 50 to 115, or 200, or 300.

The present package may comprise two or more embodiments disclosed herein.

Definitions

The numerical figures and ranges here are approximate, and thus may include values outside of the range unless otherwise indicated. Numerical ranges (e.g., as "X to Y", or "X or more" or "Y or less") include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

The terms "blend" or "polymer blend," as used herein, is a blend of two or more components (or two or more polymers). Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The terms "comprising", "including", "having" and their derivatives do not exclude the presence of any additional component, or procedure. The term, "consisting essentially of" excludes any other component or procedure, except those essential to operability. The term "consisting of" excludes any component, procedure not specifically stated.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

Test Methods

DSC Crystallinity

Differential Scanning Calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using the Equation below:

% Crystallinity=(($H_f$)/292 J/g)×100

The heat of fusion ($H_f$) and the peak melting temperature are reported from the second heat curve. Peak crystallization temperature is determined from the cooling curve.

Density is measured in accordance with ASTM D 792 and is reported as grams per cubic centimeter (g/cc).

Melt index (MI) is measured in accordance with ASTM D 1238, Condition 190° C./2.16 kg (g/10 minutes).

Molecular weight distribution ("MWD")—Polymer molecular weight is characterized by high temperature triple detector gel permeation chromatography (3D-GPC). The chromatographic system consists of a Polymer Laboratories (Amherst, Mass., now part of Varian, Inc, Shropshire, UK) "PL-GPC 210" high temperature chromatograph, equipped with a concentration detector (RI), a Precision Detectors (Amherst, Mass.) 2-angle laser light scattering detector, Model 2040, and a 4-capillary differential viscometer detector, Model 220, from Viscotek (Houston, Tex.). The 15° angle of the light scattering detector is used for calculation purposes.

Data collection is performed using VISCOTEK TriSEC software version 3, and a 4-channel VISCOTEK Data Manager DM400. The system is equipped with an on-line ERC-3415a four channel degasser system from ERC Inc (Tokyo, JP). The carousel compartment is operated at 150° C. for polyethylene and 85° C. for EPDM, and the column compartment is operated at 150° C. The columns are four Polymer Lab Mix-A 30 cm, 20 micron columns. The polymer solutions are prepared in 1,2,4-trichlorobenzene (TCB). The samples are prepared at a concentration of 0.1 grams of polymer in 50 ml of TCB. The chromatographic solvent and the sample preparation solvent contain 200 ppm of butylated hydroxytoluene (BHT). Both solvent sources are nitrogen purged. EPDM samples are stirred gently at 160° C. for one hour. The injection volume is 200 μl, and the flow rate is 1.0 ml/minute.

Calibration of the GPC column set is performed with 21 narrow molecular weight distribution polystyrene standards. The molecular weights of the standards range from 580 to 8,400,000, and are arranged in 6 "cocktail" mixtures, with at least a decade of separation between individual molecular weights. The polystyrene standard peak molecular weights are converted to polyethylene molecular weights using the following equation (as described in Williams and Ward, J. Polym. Sci., Polym. Let., 6, 621 (1968)): Mpolyethylene=A×(Mpolystyrene)$^B$ (1A), where M is the molecular weight, A has a value of 0.39 and B is equal to 1.0. A fourth order polynomial is used to fit the respective polyethylene-equivalent calibration points.

The total plate count of the GPC column set is performed with EICOSANE (prepared at 0.04 g in 50 milliliters of TCB, and dissolved for 20 minutes with gentle agitation.) The plate count and symmetry are measured on a 200 microliter injection according to the following equations:

PlateCount=5.54*(RV at Peak Maximum/(Peak width at ½ height))^2 (2A), where RV is the retention volume in milliliters, and the peak width is in milliliters Symmetry=(Rear peak width at one tenth height−RV at Peak maximum)/(RV at Peak Maximum−Front peak width at one tenth height) (3A), where RV is the retention volume in milliliters, and the peak width is in milliliters.

Mooney viscosity ("MV")—Interpolymer MV (ML1+4 at 125° C.) is measured in accordance with ASTM 1646-04, with a one minute preheat time and a four minute rotor operation time. The instrument is an Alpha Technologies Rheometer MDR 2000. For dual reactor polymerizations in series, the Mooney viscosity of the second reactor component is determined by the following equation: log ML=n(A) log ML(A)+n(B) log ML(B); where ML is the Mooney viscosity of the final reactor product, ML(A) is the Mooney viscosity of the first reactor polymer, ML(B) is the Mooney viscosity of the second reactor polymer, n(A) is the weight fraction of the first reactor polymer, and n(B) is the weight fraction of the second reactor polymer. Each measured Mooney viscosity is measured as discussed above. The weight fraction of the second reactor polymer is determined as follows: n(B)=1−n(A), where n(A) is determined by the known mass of first polymer transferred to the second reactor.

Unconfined Yield Strength Test

As used herein, "unconfined yield strength" is measured according to the following test.

The following test is a modified test from the yield strength test described in Andrew W. Jenike, "Storage and Flow of Solids", Bulletin No. 123 of the Utah Engineering Experiments Station 1964 and the uniaxial compression test described by William's, Powder Technology, 4, 1970171, pp. 328-337. The test can be carried out by first filling the polymeric material to be tested into a split steel cylinder having a diameter of two inches and a height of four inches. The material is subjected to a consolidation pressure of 275 pounds per square foot (1345 kg/m$^2$) for three days at a temperature of 37° C. at a controlled moisture, that is, relative humidity. After consolidation, the resulting polymer cylinder, comprised of individual particles, is compressed between two parallel plates oriented on the top and bottom of the cylinder at a rate of 2 millimeter per minute at ambient conditions. The compressive force required to achieve the failure, that is, falling apart, of the cylinder comprised of individual particles corresponds to the unconfined yield strength of the bulk material for the respective test conditions.

Some embodiments of the present disclosure will now be described in detail in the following Examples.

EXAMPLES

1. Materials

Pellets composed of several different types of EPDM are evaluated. The properties for the EPDM used in the examples are provided in Table 1 below.

TABLE 1

|  | Nordel™ 4770 P | Nordel™ 245P | Nordel™ 4725P | Nordel™ 4760P | Nordel™ 4785P | Nordel™ 3722P |
|---|---|---|---|---|---|---|
| Composition* | | | | | | |
| Ethylene | 70 | 70 | 70 | 67 | 68 | 71 |
| Propylene | 25 | 28.5 | 25 | 28 | 27 | 28.5 |
| ENB | 05 | 0.5 | 5 | 5 | 5 | 0.5 |
| Mooney viscosity | 70 | 45 | 25 | 60 | 85 | 18 |
| Density (g/cc) | 0.88 | 0.88 | 0.88 | 0.88 | 0.88 | 0.88 |
| Crystallinity (%) | 13 | 12 | 12 | 10 | 8 | 15 |
| Tc (° C.) | 34 | 34 | 36 | 35 | 29 | 46 |

*Composition - amounts are shown in wt % based on total weight EPDM.

Materials used for the coating are provided in Table 2 below.

TABLE 2

| Dust Coating Type | Source | Key Properties |
|---|---|---|
| Amorphous Silica | FloGard™ FF from PPG | Particle size distribution: 3-200 microns<br>Surface area = 180 m²/g<br>Bulk density = 128 kg/m³ |
| Talc | MP 10-52 from Specialty Minerals | Particle size distribution: 2-10 microns<br>Bulk density = 103 kg/m³ |
| PE Dust | Coathylene HA2454 from DuPont | Particle size distribution: 9-200 microns<br>Bulk density = 300-500 kg/m³ |

Example 1

EPDM pellets (NORDEL™ 4770P) with a residual moisture of 2200 ppm are coated in a batch drum mixer with (i) amorphous hydrophilic silica (Flo-Gard™ FF), and (ii) amorphous hydrophilic silica/talc mixture (ratio of 5:3). The comparative sample of PE dust coated pellet is obtained from the process. All samples are coated with 8000 ppm of coating agent. The pellet temperature during coating is approximately 22° C.

The coated samples are sealed in transparent flexible polyethylene bags and placed on a pallet in a warehouse at ambient conditions. Visual observations for condensation inside the bag are made after 8 hours, 24 hours, 48 hours, 72 hours and 168 hours.

TABLE 3

| Time Elapsed, hours | PE Dust Coating (8000 ppm) | Silica Coating (8000 ppm) | Silica 5000 ppm + Talc 3000 ppm |
|---|---|---|---|
| 8 | Extremely Wet | Very Wet | Very Wet |
| 24 | Extremely Wet | Very Wet | Very Wet |
| 48 | Extremely Wet | Wet | Wet |
| 72 | Extremely Wet | Almost Dry | Almost Dry |
| 168 | Wet | Dry | Dry |

Definition of Visual Observations:
Extremely Wet—Internal surface of the bag is saturated with condensed moisture appearing as large droplets.
Very Wet—Very fine droplets and condensation at all surfaces
Wet—Very fine droplets, patchy and not covering all surfaces
Almost Dry—Condensation is barely visible within the bag
Dry—No visible condensation anywhere within the bag This example as and shown in Table 3 demonstrates the noticeable reduction in free moisture on the inside surface of the sealed bags due to the presence of amorphous hydrophilic silica (Flo-Gard™ FF) in the pellet coating. The present silica-based coating prevents moisture from condensing in the bag interior from 7 days (168 hours) after the bag is sealed to 365 days (1 year) after the bag is sealed, to 1000 days after the bag is sealed.

Example 2

Various grades of NORDEL™ IP pellets are coated uniformly with PE dust at 8000 ppm and Silica at 6000 ppm (as shown in Table 4 below). The blocking test procedure is performed on the samples after consolidation at 37° C. for 2 months at consolidation stress of 275 lb/ft² (1345 kg/m²). The improved blocking characteristic of silica coated pellets is demonstrated by the lower value of unconfined yield strength.

TABLE 4

| Product* | Unconfined Yield Strength for PE Dust (Coathylene HA2454) @ 8000 ppm Coated Pellets, lb/ft² | Unconfined Yield Strength for Silica (Flo-Gard™ FF) @ 6000 ppm Coated Pellets, lb/ft² |
|---|---|---|
| 4770P | 185 | 0 |
| 245P | 242 | 35 |
| 4725P | 195 | 37 |
| 4760P | 251 | 106 |
| 4785P | 295 | 108 |
| 3722P | 157 | 40 |

TABLE 4-continued (With US units—pounds per square foot (lb/ft²) and SI Units—Newtons per square meter (N/m²))

| Product* | Unconfined Yield Strength for PE Dust (Coathylene HA2454) @ 8000 ppm Coated Pellets, lb/ft² | Unconfined Yield Strength for PE Dust (Coathylene HA2454) @ 8000 ppm Coated Pellets, N/m² | Unconfined Yield Strength for Silica (Flo-Gard ™ FF) @ 6000 ppm Coated Pellets, lb/ft² | Unconfined Yield Strength for Silica (Flo-Gard ™ FF) @ 6000 ppm Coated Pellets, N/m² |
|---|---|---|---|---|
| 4770P | 185 | 8854 | 0 | 0 |
| 245P | 242 | 11582 | 35 | 1675 |
| 4725P | 195 | 9333 | 37 | 1771 |
| 4760P | 251 | 12013 | 106 | 5073 |
| 4785P | 295 | 14119 | 108 | 5169 |
| 3722P | 157 | 7514 | 40 | 1914 |

*Product is NORDEL ™ EPDM

Example 3

Three 20 kg samples of EPDM (NORDEL™ 4785P) pellets are coated with 6000 ppm of amorphous hydrophilic silica (Flo-Gard™ FF), 6000 ppm talc (Specialty Minerals MP 10-52) and a 50/50 mixture of silica/talc (3000/3000) at 6000 ppm respectively. The pellet moisture is measured at 3700 ppm. The coated pellets are sealed in transparent flexible polyethylene bags and placed in an oven at 37° C. for 24 hours. Thereafter, the bags are kept at 21° C. for further visual observations (8 hr, 24 hr and 48 hr). The visual observations on condensation within the bag after 48 hours demonstrate improved performance of silica-based coatings composed of amorphous hydrophilic silica.

TABLE 5

| Time Elapsed, hours | Talc Coating (6000 ppm) | Silica Coating (6000 ppm) | Silica 3000 ppm + Talc 3000 ppm |
|---|---|---|---|
| 8 | Very Wet | Very Wet | Very Wet |
| 24 | Very Wet | Wet | Wet |
| 48 | Very Wet | Almost Dry | Almost Dry |

Amorphous silica (hereafter "a-silica") and a-silica/talc mixtures prevent moisture condensation on the sealed bag interior beginning from seven days (168 hours) after sealing of the bag to 365 days (1 year) after sealing of the bag up to 1000 days after sealing the bag (1000 days being the shelf-life of the EPDM pellets). Talc alone forms a moist paste which adheres to the bag interior resulting in EPDM pellet product with poor and undesirable appearance. The a-silica absorbs moisture due to its porosity and favorable surface chemistry. EPDM pellets coated with (i) 5000-10,000 ppm a-silica or (ii) 5000-10,000 ppm of a-silica/talc prevent residual moisture from the pellets from condensing on the inner surface of the sealed bag.

The a-silica is not conducive to dust explosion, is hydrophilic, is porous (moisture scavenging), exhibits good anti-blocking characteristics, is easy to apply, is food-contact acceptable, has no static charges, and has no adverse effect on EPDM performance or processing.

Figure 2:
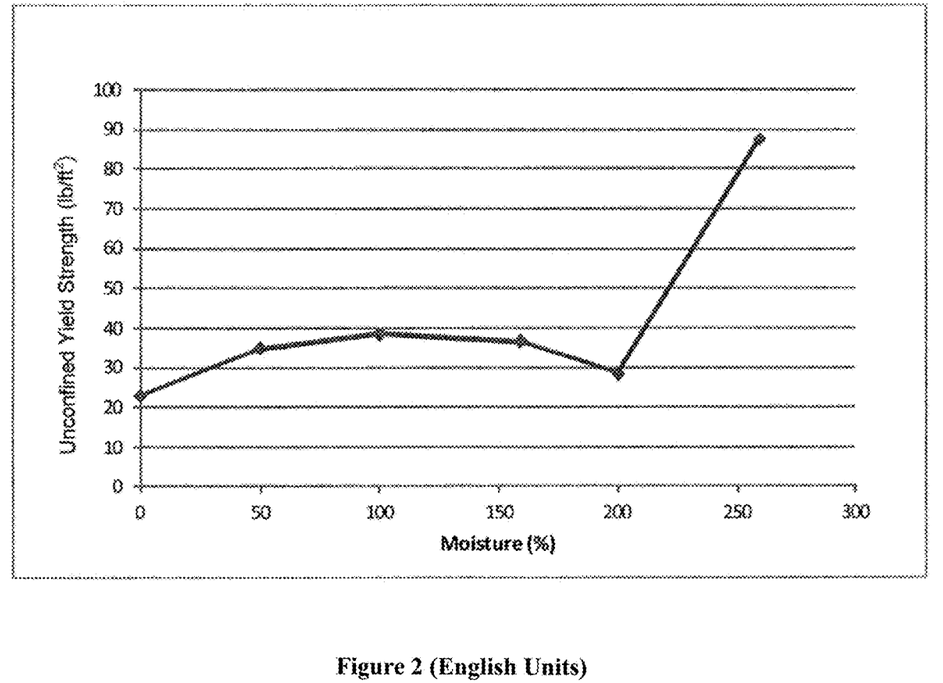
FIG. 2 is a graph showing the unconfined yield strength (U.S. units) vs. moisture content for an amorphous silica powder in accordance with an embodiment of the present disclosure.
Figure 3:
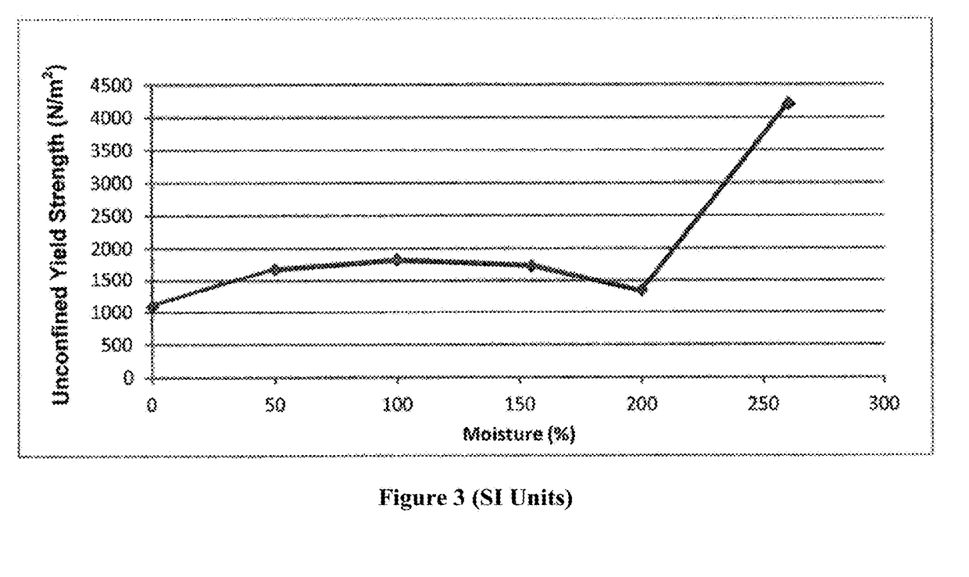
FIG. 3 is a graph showing the unconfined yield strength (SI units) vs. moisture content for an amorphous silica powder in accordance with an embodiment of the present disclosure.

It has been found that the equilibrium moisture of the coating must exceed the total residual moisture in the pellets. The equilibrium moisture at storage temperature and 100% relative humidity was measured as follows:

Silica dust becomes cohesive as it gains moisture. Therefore, the upper limit of moisture is determined by increase in unconfined yield strength (see FIG. 2). For FloGard FF, the upper limit on moisture absorption is found to be approximately 2 times the weight of the powder. The graph in FIG. 2 shows the unconfined yield strength (UYS) of the FloGard FF with different loading levels of water from 0 to 2.5 times the mass of the amorphous silica. From 0 to 2 times water loading the UYS is consistently below 40 lb/ft². After 2 times water loading an increase of the UYS is seen to be several times higher than other samples. This shows that the silica begins to become cohesive when an excess loading of water occurs.

FIG. 2 shows the FloGard FF can hold up to 2 times its weight in water while still appearing dry and flowing. This level of moisture uptake occurs more rapidly when the FloGard FF is in direct contact with liquid water.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A process comprising:
    introducing, into a mixing device, gross melt fracture pellets composed of ethylene/propylene/diene polymer comprising greater than 60 wt % units derived from ethylene, the pellets having a residual moisture content from 500 ppm to 2500 ppm;
    adding a silica-based powder to the mixing device;
    coating at least a portion of the pellets with the silica-based powder;
    sealing a bulk amount of the coated pellets in a bag made of a flexible polymeric film;
    absorbing, with the silica-based powder, the residual moisture from the pellets; and
    preventing moisture condensation in the bag interior at ambient conditions (37° C.) for a period from 7 days after the sealing step to 1000 days after the sealing step.

2. The process of claim 1 comprising forming coated pellets having a maximum unconfined yield strength of less than 200 pounds per square foot after 2 months storage at 37° C.

3. The process of claim 1 comprising coating at least a portion of the pellets with amorphous silica.

4. The process of claim 1 comprising coating at least a portion of the pellets with a blend of an amorphous silica and talc.

5. The process of claim 1 comprising coating a least a portion of the pellets with the silica-based powder to the exclusion of adding a binding agent to the pellets.

6. The process of claim 1 comprising adding from 3000 ppm to 10000 ppm of the silica-based powder, based on the total weight of the pellets and the silica-based powder, to the mixing device.

7. The process of claim 1 comprising introducing from 15 kg to 1500 kg of the gross melt fracture pellets into the mixing device.

* * * * *